Patented Apr. 25, 1939

2,156,141

UNITED STATES PATENT OFFICE 2,156,141

HETEROCYCLIC AZO COMPOUNDS AND A METHOD OF PRODUCING THE SAME

Arthur Binz, Berlin-Wilmersdorf, and Otto von Schickh, Berlin, Germany, assignors to Schering Aktiengesellschaft, Berlin, Germany, a corporation of Germany No Drawing. Application April 16, 1935, Serial No. 16,609. In Germany April 17, 1934

10 Claims. (Cl. 260—156)

This invention refers to new chemical products of therapeutical value and more particularly to heterocyclic azo compounds and a method of making the same.

By the process described in Patent No. 1,862,361, dated June 7, 1932, compounds with strong bactericidal qualities can be produced by coupling with mono- and diamino pyridines, diazotized amino compounds of the pyridine or quinoline series whose amino group does not possess tautomeric characteristics and which have at least one other substituent besides the amino group.

It is furthermore known that azo compounds which also possess powerful bactericidal characteristics can be obtained by reacting diazotized aromatic amines with 2.6-diamino pyridine.

Now, it has been discovered that particularly effective products for the same therapeutic uses can be obtained on causing diazotized arylamines or their substitution products to react with 3.5-diamino pyridine or its substitution products, such as hydroxy, alkoxy, halogen, alkyl and the like derivatives.

In the production of these compounds it must be regarded as unexpected and surprising from a chemical point of view that coupling takes place with pyridines which are substituted not only in 5-position, but also in 3-position. For, in the case of all previously described compounds, either the 3- or the 5-position is unoccupied and the coupling always takes place at this place. Furthermore, by reason of the fact that, for instance, 3- or 5-amino pyridine do not show the "helianthin reaction", i. e. do not couple with diazotized sulfanilic acid, it was to be expected that coupling would not take place in the case of pyridines substituted in both positions.

The following examples serve to illustrate the invention, without however limiting the same to them:

Example 1

218 parts of 3.5-diamino pyridine are dissolved in hydrochloric acid. To this ice-cooled solution there is added, whilst stirring, a hydrochloric acid solution, also ice-cooled, of diazo benzene, obtained by diazotizing 186 parts of aniline with a concentrated solution of 138 parts of sodium nitrite. After half an hour it is rendered alkaline by the addition of sodium carbonate solution whereby the azo compound precipitates as a yellowish red sediment. It is filtered off and recrystallised from a little methanol. The product is thus obtained in dark-red crystals of the melting point 178° C. The yield is quantitative.

Example 2

33 parts of 3.5-diamino pyridine are dissolved in hydrochloric acid and cooled by the addition of ice. To this solution there is added, whilst stirring, an ice-cooled hydrochloric acid solution of p-chloro diazo benzene produced by diazotizing 38 parts of p-chloro aniline with a concentrated aqueous solution of 21 parts of sodium nitrite. After half an hour the mixture is rendered alkaline whereby the new dyestuff precipitates. By re-crystallisation from diluted methanol the substance is obtained in the form of red-brown crystals of the melting point 209° C. (decomposing thereby). The yield is quantitative.

In the place of p-chloro aniline there may be used ortho-chloro aniline which yields a pink dyestuff having a decomposition point of 237° C.

On employing m-chloro aniline in the place of p-chloro aniline a yellowish brown dyestuff having a decomposition point of 186° C., is obtained.

One may also use p-bromo aniline. In that case it is necessary to employ 52 parts of the same instead of 38 parts of p-chloro aniline. A dyestuff is obtained which is of reddish brown colour and has a decomposition point of 217–218° C.

Example 3

On replacing the solution of p-chloro diazo benzene in Example 2 by a solution of p-methoxy diazo benzene, produced by diazotizing 37 parts of p-anisidine with a concentrated aqueous solution of 21 parts of sodium nitrite, an azo dyestuff is obtained on working in the same manner, said dyestuff separating in quantitative yield from pyridine in orange colored crystals of the melting point 245° C. (thereby decomposing).

Example 4

On replacing the solution of p-chloro diazo benzene in Example 2 by a solution of β-diazo naphthalene which has been produced by diazotizing 43 parts of β-naphthylamine with a concentrated aqueous solution of 21 parts of sodium nitrite, an azo dyestuff is obtained on working in the same manner, which precipitates from pyridine in dark-brown crystals having a melting point of 192° C. The yield is quantitative.

Example 5

66 parts of 3.5-diamino pyridine are dissolved in hydrochloric acid. To this solution, cooled by ice, there is added, whilst stirring, a solution of p-diazo benzene sulfonic acid, also cooled with ice, which has been produced in the usual manner by diazotizing 126 parts of sulfanilic acid with 42 parts of sodium nitrite. In order to complete the coupling the solution is just rendered alkaline by the addition of sodium hydroxide solution. After standing for sometime the new dyestuff precipitates partly in the form of its sodium salt. This forms orange-colored crystals after re-crystallisation from little water. From the combined mother-liquors the still dissolved dyestuff is precipitated as free sulfonic acid by the addition of glacial acetic acid. After being filtered off by suction it is thoroughly washed with water and, after drying, obtained in the form of a red powder. In this manner the dyestuff is obtained in a quantitative yield.

*Example 6*

33 parts of 3.5-diamino pyridine are dissolved in dilute hydrochloric acid. To this solution which is cooled with ice, there is added, whilst stirring, an ice-cooled solution of o-diazo benzoic acid which has been produced in the usual manner by diazotizing 41 parts of anthranilic acid with 21 parts of sodium nitrite. For completing the coupling process the solution is rendered alkaline by the addition of ammonia whereupon the dyestuff is precipitated by adding glacial acetic acid thereto. After filtering off by suction it is thoroughly washed with water and, after drying, is obtained in approximately quantitative yield in the form of a red powder. It is difficulty soluble in cold and hot water and the usual organic solvents, but is soluble in dilute alkali lyes.

*Example 7*

19.8 parts of 2-hydroxy-3.5-diamino pyridine, obtained by reducing the known 2-hydroxy-3.5-dinitro pyridine in the usual manner with stannous chloride, are dissolved in dilute hydrochloric acid. To the ice-cooled solution there is added, while stirring, a solution of diazo benzene obtained by diazotizing 9.3 parts of aniline with 6.9 parts of sodium nitrite. In order to complete the coupling reaction the solution is rendered alkaline by adding ammonia thereto, whereby the dyestuff precipitates as a dark-red precipitate. On washing the same thoroughly with water it is obtained in pure form and with a quantitative yield.

Reference is hereby made to applicants' copending application Serial No. 16,608, filed April 16, 1935, entitled "Compounds of heterocyclic azo derivatives and a method of making the same", which describes subject matter related to the present invention.

Of course, many variations and changes may be made in the reaction conditions and other details disclosed in the foregoing specification by those skilled in the art without departing from the invention or sacrificing the advantages thereof and in accordance with the principles set forth herein and in the claims annexed hereto.

What we claim is:

1. A method for producing heterocyclic azo compounds comprising diazotizing an amino-substituted aryl hydrocarbon compound and coupling the diazonium compound obtained thereby, with a 3.5-diamino pyridine taken from the group consisting of 3.5-diamino pyridine and the hydroxy, halogen, alkoxy and alkyl derivatives thereof and having a position free for coupling.

2. The phenyl azo- 3,5 diamino pyridin, having a melting point of about 178° C.

3. The substituted phenyl azo- 3,5 diamino pyridins, the substituent groups being on the pyridine nucleus and being taken from the class consisting of halogen, methoxy, sulphonic and carboxylic radicals.

4. The β naphthyl azo 3,5-diamino pyridin leaving a melting point of about 192° C.

5. The diazotized amino-substituted aryl hydrocarbon compounds coupled with 3.5-diamino pyridines.

6. The chlorbenzol-azo-3.5-diaminopyridines.

7. Heterocyclic azo compounds of the structural formula:

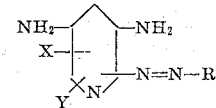

wherein R is an aryl hydrocarbon radical and wherein X and Y are radicals taken from the class consisting of hydrogen, hydroxy, alkoxy, alkyl and halogen, said compounds being colored substances and forming water-soluble salts with mineral acids.

8. Heterocyclic azo compounds of the structural formula:

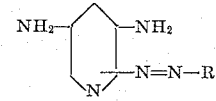

wherein R is an aryl hydrocarbon radical, said compounds being colored substances and forming water-soluble salts with mineral acids.

9. The 1' halogen benzol-azo-3.5 diaminopyridines, the halogen being taken from the class consisting of chlorine and bromine.

10. The class of aryl azo diamino pyridine compounds consisting of phenyl azo 3.5 diamino pyridines and naphthyl azo 3.5 diamino pyridines.

OTTO VON SCHICKH.
ARTHUR BINZ.